April 14, 1931.  F. GIBSON  1,800,621
DRAG CART
Filed March 4, 1930  2 Sheets-Sheet 2
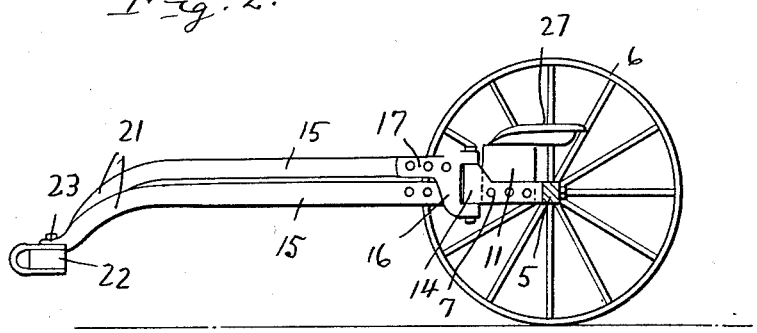
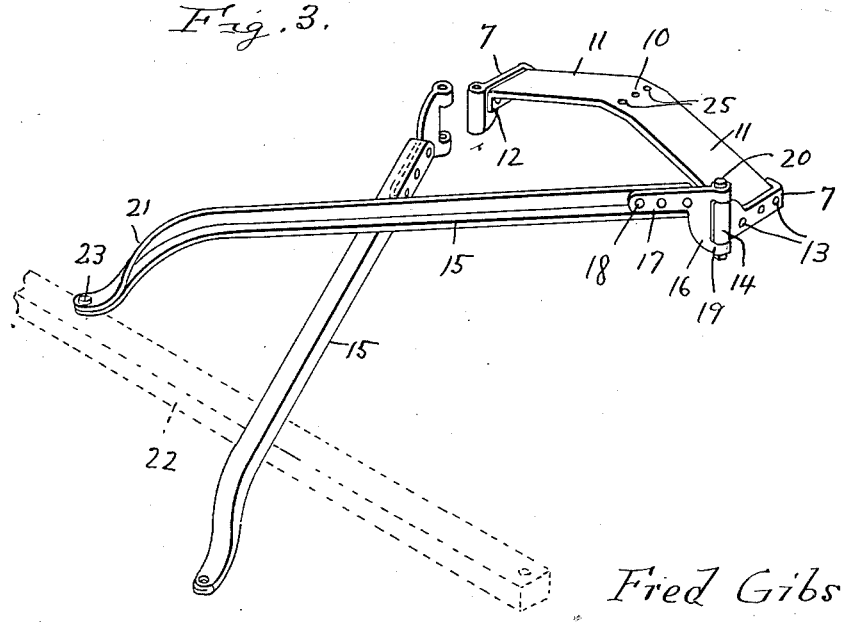
Inventor
*Fred Gibson*
By *Clarence A O'Brien*
Attorney Patented Apr. 14, 1931

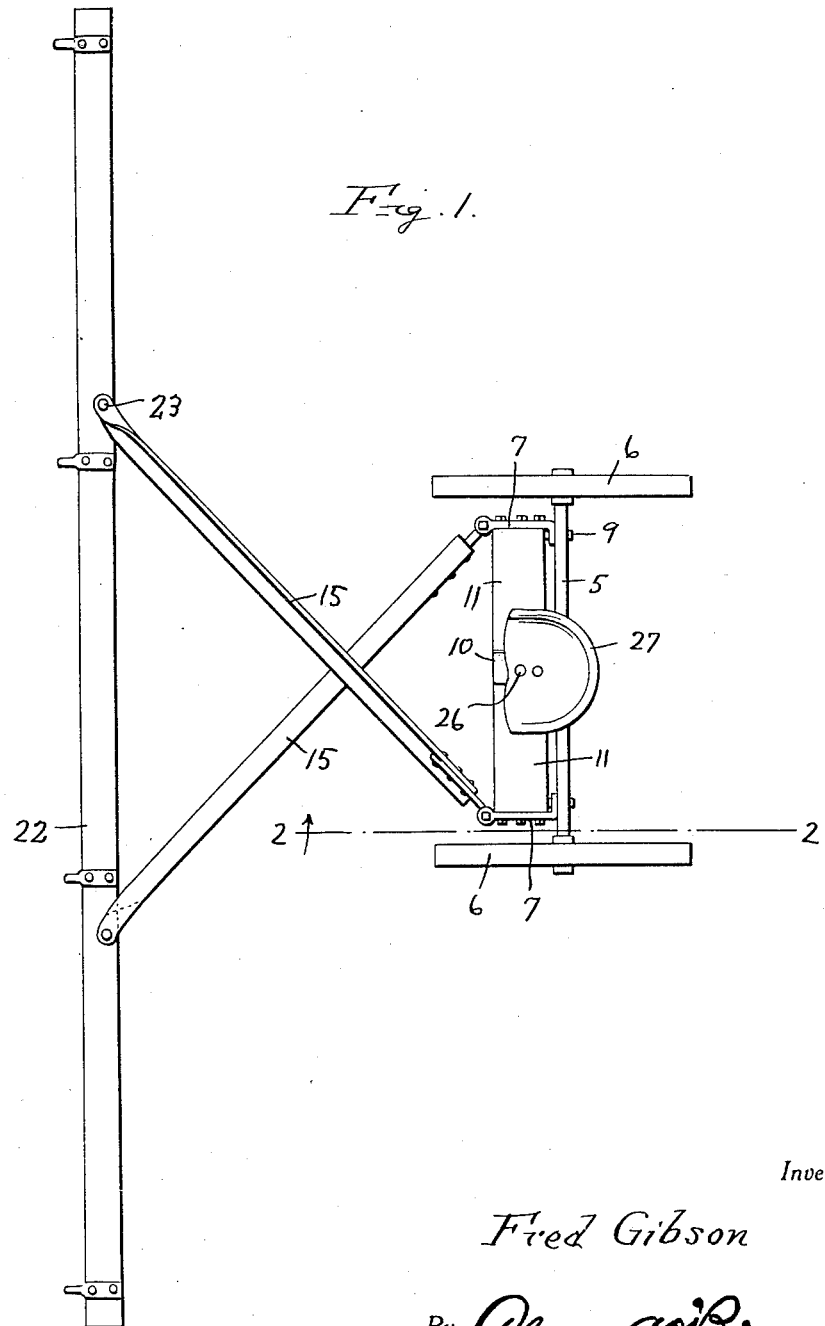

1,800,621

UNITED STATES PATENT OFFICE

FRED GIBSON, OF MORTON, MINNESOTA

DRAG CART

Application filed March 4, 1930. Serial No. 433,106.

This invention relates to certain new and novel improvements in drag carts of the type used in conjunction with harrows and similar cultivator structures.

A primary object of this invention is to provide a drag cart of the character above mentioned which will in no wise interfere with the operation of the harrow to permit of abrupt turns, and will exert little or no lateral pull when making a turn.

A still further object of the invention is to provide a cart of this character, which is comparatively simple in construction, thoroughly reliable, practical and efficient in operation and otherwise well adapted for the purpose designed.

Other objects and advantages of the invention will become apparent during a study of the following description, taken in connection with the accompanying drawings, wherein:

Figure 1 is a top plan view of the cart,

Figure 2 is a sectional view on line 2—2 of Figure 1,

Figure 3 is a perspective view illustrating more clearly the manner of securing the rear end of the cross reach bars to the seat supporting bar.

With reference more in detail to the drawings, it will be seen that my improved cart comprises an axle 5 having wheels 6 journalled on the ends thereof. Brackets 7 are bolted as at 8 to the axle 5 inwardly from the end of the axle and extend forwardly therefrom. An arched seat supporting bar 10 has offset ends 11, which ends 11 merge into downwardly extending attaching flanges 12 bolted to the brackets 7 as at 13.

At their forward ends, each of the brackets terminate in a vertically disposed bearing sleeve 14.

A pair of cross reach bars 15, preferably of angle iron construction at their rear ends have secured thereto a plate 16, which plate 16 has an attaching arm 17 formed integral therewith and bolted as at 18 to one flange of the reach bar. The plates 16 are each further provided with spaced vertically alined apertured bearing ears 19 adapted to aline with the respective bearing sleeves 14, and a pivot bolt 20 is extended through said ears 19 and sleeve 14, thus forming a hinge connection between the rear ends of said cross reach bars 15 and the respective ends of the arched bar 10.

At their forward ends each of the reach bars 15 are bent downwardly and forwardly as at 21, the vertical flange of the respective bars 15 being twisted to overlap the horizontal flange of the channel bar. The terminals of the downwardly curved ends 21 of the respective bars are pivoted to an evener 22 through the medium of pivot bolts 23.

The intermediate portion of the arch bar 10 is suitably perforated as at 25 for the reception of bolts or other fastening elements 26 passing through a suitable seat 27 mounted on said intermediate portion of the arch bar 10, for rigidly securing the seat in position.

In actual practice, and as well known in the art, a harrow or other suitable cultivating implement not shown, may be attached to the evener 22 and be conveniently controlled by the operator seated on the seat 27.

Of course, the reach bars 15 may slide relative to one another thus enabling the making of a relatively sharp turn and permitting lateral movement of the evener relative to the axle 5.

It is thought that from the foregoing description, taken in connection with the accompanying drawings a clear understanding of the operation, construction, utility and advantages of this invention will be had by those skilled in the art without a more detailed description.

Even though I have herein shown and described the preferred embodiment of my invention, it is to be understood that the same is susceptible to changes coming within the spirit of the invention and the scope of the appended claim.

Having thus described my invention, what I wish to claim as new is:

A drag cart comprising an axle, wheels journalled on the ends of said axle, a seat supporting bar, brackets mounted on said axle and engageable with the ends of said seat supporting bar, each of said brackets including a vertical bearing sleeve, a pair of cross reach bars, a plate secured to the rear end of each rear bar, a pair of vertically alined apertured bearing ears formed on said plate and adapted to aline with one of said bearing sleeves, a pivot bolt passing through said ears and the alined bearing sleeves, and an evener connecting the free ends of said reach bars.

In testimony whereof I affix my signature.

FRED GIBSON.